Figure 1:
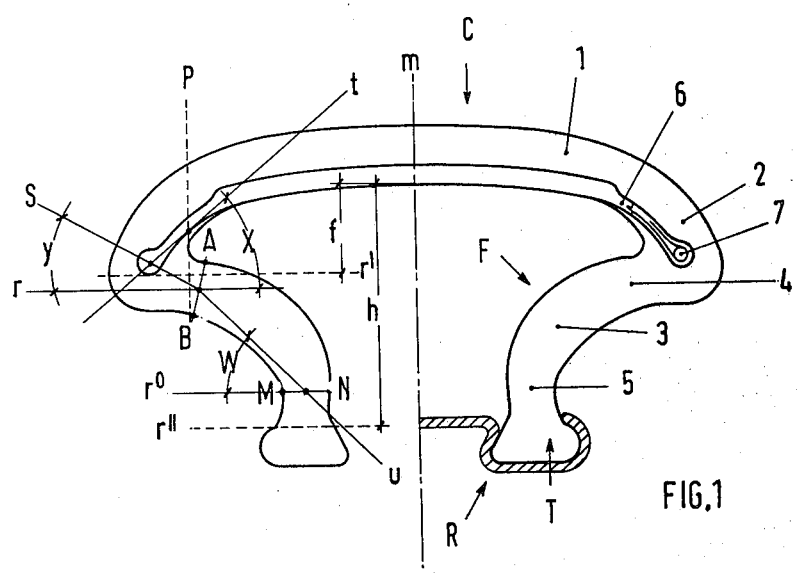

United States Patent [19]

Calori

[11] 4,307,767
[45] Dec. 29, 1981

[54] PNEUMATIC TIRES FOR VEHICLE WHEELS

[75] Inventor: Giovanni Calori, Milan, Italy

[73] Assignee: Industrie Pirelli, S.p.A., Milan, Italy

[21] Appl. No.: 158,205

[22] Filed: Jun. 10, 1980

Related U.S. Application Data

[63] Continuation-in-part of Ser. No. 913,130, Jun. 6, 1978, abandoned.

[30] Foreign Application Priority Data

Jun. 24, 1977 [IT] Italy .............................. 25019 A/77

[51] Int. Cl.³ .............................................. B60C 9/18
[52] U.S. Cl. ............................ 152/353 R; 152/361 R; 152/361 FP
[58] Field of Search ........... 152/330 R, 352 R, 352 A, 152/353 R, 353 C, 354 R, 361 R, 361 FP, 361 DM

[56] References Cited

U.S. PATENT DOCUMENTS

| | | | |
|---|---|---|---|
| 3,708,007 | 1/1973 | Roberts | 152/361 FP |
| 3,805,868 | 4/1974 | Tangorra | 152/353 R |
| 3,831,657 | 8/1974 | Dillenschneider | 152/361 FP |
| 3,840,060 | 10/1974 | Tangorra | 152/353 R |
| 3,870,095 | 3/1975 | Tangorra | 152/353 C |

Primary Examiner—John E. Kittle

Attorney, Agent, or Firm—Stevens, Davis, Miller & Mosher

[57] ABSTRACT

A pneumatic tire for motor vehicles having a generally trapezoidal section with a top portion which is generally convex towards the outside and wider than any other part of the tire, beads, and two sidewalls. The sidewalls spread outwardly from the beads to zones which connect the sidewalls with the top portion. The top portion has a central tread portion which is normally in contact with the ground when the tire is under load, and lateral shoulders which are spaced from the ground during rectilinear running of the vehicle. The sidewalls have zones which are less resistant to bending adjacent to the shoulders and adjacent to the beads than the parts which are intermediate the shoulders and beads. The less resistant zones act as hinges under load on the tread. A generally annular reinforcing structure for the tread, which is substantially inextensible in the axial and circumferential direction, is folded at its ends about reinforcing annular straps arranged in each shoulder. In any radial section, the cincture connection angle, which is the angle between a straight line drawn through the center of the hinge adjacent to each shoulder and parallel to the tire axis and a straight line drawn through the center of the shoulder hinge and the center of the strap, is between −10° and 30°.

14 Claims, 8 Drawing Figures

PNEUMATIC TIRES FOR VEHICLE WHEELS

This application is a continuation-in-part of my copending application Ser. No. 913,130 filed June 6, 1978 now abandoned.

This invention relates to pneumatic tires for vehicle wheels of the type described in U.S. Pat. No. 3,805,868 granted Apr. 23, 1974 and, more particularly, to a vehicle pneumatic tire of such type having an annular reinforcing structure disposed in a radially inner position with respect to the tread.

The pneumatic tires disclosed in U.S. Pat. No. 3,805,868 have a trapezoidal section and a top portion, generally convex towards the outside which is larger in cross-section than any other part of the tire and includes the tire tread. Such a tire is provided with a generally annular, substantially circumferentially inextensible tread reinforcing structure, and has two sidewalls which connect the top portion with the tire beads. The sidewalls are spread out from the beads to the points of connection to the top portion and normally have a convexity directed towards the inside of the tire. The sidewalls, when the tire is in an inflated condition, are in a state of substantial compression.

In the tires described in the aforesaid patent and in similar tires, the sidewalls have thinner portions in their zone of connetion to the top portion, and, preferably, also in proximity of the beads.

These thinner portions act as imperfect hinges, allowing mutual rotation of the parts adjacent to them, due to flexion stresses of the parts.

In the present application unless otherwise stated, the expression "flexion stresses" means the stresses referred to in the radial section of the tire, namely those related to flexions in consequence of which each element of the tire moves in the plane of the radial section containing it.

The above indicated anular reinforcing structure is in general constituted by a plurality of superimposed layers of rubberized cords, the cords of each layer being parallel to one another and crossing those of adjacent layers. The cords of each layer can also be formed of various materials such as, for instance, textile or metallic materials, or suitable materials of other kinds, and can be combined with analogous types of cords of the other layers or can be made of a different material depending upon the intended purposes.

It is known that the annular reinforcing structure plays an important role on the general behavior of the tire in use, since it has a substantial influence on several operation characteristics, such as, for instance, tread wear, road traction, road holding ability, resistance to lateral thrust, riding comfort and so on.

In fact, although the tire part which comes into contact with the ground is the tread, it is, however, the annular reinforcing structure which withstands the deformation suffered by the tire in use.

As stated above, the tread constitutes only a part of the top portion of the tire. More precisely, only the central part of the tread, normally from 0.6 to 0.8 of the total width of the tire is in contact with the ground during the rectilinear travel of the vehicle. This constitutes the true tread, while the marginal parts of the top portion only occasionally contact the ground or may never contact the ground.

These marginal parts or shoulders are subjected in use to considerable flexion stresses with respect to the tread which flattens on the ground during running of the vehicle. In fact, the load is applied to the shoulders through the reaction exerted by the sidewalls which are in a substantial compression state.

Moreover, theoretically a joint-type connection should take place in the zones between the top portion and the sidewalls. In other words, the parts of the top portion and of the sidewall which join together, although they are free to move and rotate in the space, should remain in a substantially constant mutual angular relationship.

In tires of the kind disclosed in the aforesaid patents, this can be allowed, up to a certain point, by the above indicated imperfect hinges, namely by thinner zones or zones of reduced bending stiffness disposed in the sidewalls and in particular in the zones which connect the sidewall to the top portion, or even out of those zones.

Notwithstanding this, the sidewalls and the top portion are pushed to rotate the one with respect to the other in the connection zones, but, for good performance of the tire, it is desirable to reduce the rotation to a minimum.

Because of the flexion stresses, to which the shoulders and the zones connecting the sidewalls and top portion of the tire are subjected, the bending stiffness of the reinforcing structure as well as its substantial inextensibility in the circumferential and axial direction is important.

This bending stiffness of the reinforcement may be obtained, for instance, by folding the ends of the annular reinforcing structure about a reinforcing element constituted, for instance, by a plurality of cords, or by a body of any shape made of elastomeric material and reinforced with glass fibers or with any other suitable material which increases its rigidity.

On the other hand, the evident signs of the serious strain suffered by the tire shoulders after a certain period of use, in spite of the presence of an annular reinforcing structure stiffened in this way, are clearly indicative of the fact that the structure is not sufficient, by itself, to prevent the flexion stresses in the shoulders and that the solution of the problem is related to other still unknown characteristics.

An object of the present invention is to provide a vehicle tire of the above described type which is substantially free from flexion stresses in its shoulders. Another object of the invention is to provide a pneumatic tire having a trapezoidal section and a top which is generally convex toward the outside and is wider than any other part of the tire with an improved reinforcing or breaker structure.

Other objects will become apparent from the following description with reference to the accompanying drawing wherein FIG. 1 illustrates in radial section one embodiment of the pneumatic tire of the invention disposed on a mounting rim showing elements of the tire structure and the above defined typical parameters; and FIGS. 2, 3, 4, 5, 6, 7 and 8 each illustrates in an enlarged fragmentary view the zone where a sidewall connects to the top portion of the tire.

As described in my parent application Ser. No. 913,130 filed June 6, 1978, the foregoing objects and others are accomplished in accordance with this invention, generally speaking, by providing a pneumatic tire for motor vehicles of the type described in the aforesaid patent, having a generally trapezoidal section and provided with a top portion generally convex towards the outside and wider than any other part of the tire, and with two sidewalls which spread outwardly from the tire's beads of the zone of connection between the sidewalls and top portion, which are convex towards the inside and are in condition of substantial compression when the tire is inflated, the top portion having a central part, or tread, which is normally in contact with the ground at the impression area when the tire is in use, and lateral parts or shoulders, which are spaced above the ground when the tire is in use and during the rectilinear running of the vehicle, the sidewalls having at least in proximity of the zone of connection to the shoulders, a section of less bending stiffness in comparison with the central part of the sidewall and of the shoulder which is capable of forming a hinge. The top portion of the tire has a generally annular reinforcing structure which is substantially inextensible in the axial and circumferential directions and is folded at its ends about annular reinforcing elements in the form of straps arranged in the shoulders, the tire being characterized in that in any radial section the "cincture connection angle" is between $-10°$ and $40°$ and the angle lying in a radially inner position with respect to the line, parallel to the tire axis, taken as reference, is negative.

This definition of the negative angle is valid for all the hereunder cited characteristic angles of the tire, which are now more exactly defined together with other non-angular parameters. In particular, in the tire provided by the invention, the following can be noted:

(1) the angle "y" formed by the straight line joining the centers of the hinge, in proximity of the shoulder, and of the strap with a first reference straight line passing through the center of the hinge and parallel to the tire axis; this parameter is defined as "cincture connection angle", (2) the angle "x" formed by the first reference straight line with the straight line tangent to the radially innermost profile of the annular reinforcing structure at the point in which the latter is intersected by the plane normal to the tire axis and tangent to the inner surface of the tire in the axially outermost points; this parameter is defined as "cincture edge angle", (3) the angle "w" formed by the straight line joining with the geometric center of the hinge in proximity of the shoulder and that of an analogous hinge in proximity of the bead with a second reference straight line, parallel to the first reference straight line and passing through the hinge in proximity of the bead; this parameter is defined as "sidewall angle", (4) the distance, measured on the center plane "m" between the radially inner surface of the top portion and the theoretical cylindrical surface, coaxial with the tire, separating the beads from the sidewalls; this distance is defined as "section height", and (5) the distance, still measured on the center plane, between the radially inner surface of the top portion and the theoretical cylindrical surface, coaxial with the tire, tangent to the radially inner end of the annular reinforcing structure is defined as "cincture camber". According to a series of convenient practical embodiments, the tire, with the "cincture connection angle" as geometrically delimited above, has moreover, on the same radial section, the following characteristics, either separately or in combination with one another:

(a) cincture edge angle "x" ranging from $10°$ to $60°$,
(b) sidewall angle "w" ranging from $30°$ to $60°$,
(c) ratio between the cincture camber "f" and the section height "h" ranging between 0.3 and 0.6.

In pneumatic tires having the above indicated geometrical characteristics both the annular reinforcing structure and the strap can be conveniently carried out in the different embodiments hereinafter described, at considerable economical advantages and, moreover, with an improvement of all the qualitative features concerning life and behavior of the tire in use.

With reference to FIG. 1, which represents a tire mounted on a rim but not yet inflated, the tire being symmetrical with respect to the center plane "m" whose path is indicated in the drawing, the right half shows the constituting elements and the left half the typical parameters, the transfer of the data from one-half to the other being easy.

The tire in question comprises a top portion C, generally convex towards the outside and two sidewalls F connecting top portion C to beads T intended to lock the tire on the rim R.

The top portion comprises a central part 1, namely a tread, which is normally in contact with the ground when the tire is in use, and two lateral parts 2, called shoulders, which are seldom, if ever, in contact with the ground.

The sidewalls have a central part 3 convex towards the inside and two end zones 4 and 5, which are connected with the top portion and with the bead. Zones 4 and 5 have a lower bending stiffness than the adjacent areas and are therefore capable of behaving with sufficient sensitivity as hinges, FIG. 1 illustrates the respective centers of zones 4 and 5, defined by the intersections of the median line of the sidewall with the lines joining the points, respectively on the inner and outer surfaces of the sidewall, situated at the minimum mutual distance. Said centers are indicated with 4A and 5A in FIGS. 1,6,7.

The top portion contains, in a radially inner position, an annular reinforcing structure 6, whose ends are folded about an annular element 7 or strap, which is contained in the shoulders and which constitutes an anchorage for the annular reinforcing structure and at the same time imparts to the annular reinforcing structure the considerable bending stiffness desired in this zone.

As said above, this annular anchorage element can be very conveniently carrier out with a plurality of substantially inextensible textile or metallic cords.

Although not specifically shown in FIG. 1, it is clear that the geometrical center of the strap, on the section, is easy to locate.

The left half of FIG. 1 shows the above defined typical parameters of the tire. More precisely, these parameters are:

the cincture connection angle "y" formed by the straight line "s" which joins the centers of the strap and of the hinge in proximity of the shoulder 2 with the reference straight line "r", the angle lying in a radially outer position with respect to the straight line "r" being positive;

the cincture edge angle "x" formed with the straight line "r" by a straight line "t" tangent to the radially innermost profile of the annular reinforcing structure at point P, in which the plane "p", normal to the tire axis and tangent to the inner surface of the tire in the axially outermost points, intersects said profile of the annular reinforcing structure, the sidewall angle "w" formed by the straight line "u" joining the centers of the hinges, respectively in proximity of the shoulder 2 and of the bead, with the reference straight line "r°" passing through the center of the hinge in proximity of the bead, located as explained above, M and N being the points situated at the minimum distance, analogously to A and B in the hinge in proximity of the shoulder, the cincture camber "f", namely the distance, measured on the center plane "m", between the radially inner surface of the top portion C and the cylindrical surface, coaxial with the tire, defined in the plane of FIG. 1 by its intersection r' tangent to the radially inner end of the annular reinforcing structure, and the section height "h", namely the distance, measured on the center plane "m", between the radially inner surface of the top portion C and the cylindrical surface coaxial with the tire, defined in the plane of FIG. 1 by its intersection r" separating the beads from the sidewalls.

In the tire according to the invention, the above indicated typical parameters are interdependent and their values are variable within the above cited ranges. The main parameter is the cincture connection angle "y".

It has in fact been surprisingly ascertained that, irrespectively of the different behavior and performance of the tire related to the variability of the other parameters, a substantial improvement of the qualitative features of the tire in use and of its service life is obtained by maintaining the angle "y" within the range of −10° and +40° and preferably between 0° and 30°.

Among the pneumatic tires geometrically identified in this way, very positive results have been obtained with those which have, singularly or in combination, a cincture edge angle between 10° and 60°, a sidewall angle between 30° and 60°, and a cincture camber between 30% and 60% of the section height h.

It is to be noted that, as regards the cincture edge angle, should its location be uncertain, the straight line "t" is to be tangent to the radially innermost profile of the annular reinforcing structure 6.

In the tires having the above indicated characteristics, certain practical embodiments both of the annular reinforcing structure and of the strap have proved particularly efficient and appropriate in improving the tire properties. These embodiments are illustrated in FIGS. 2 to 5, which represent the radial section of a tire shoulder, and in which any reference numeral has been omited since the location of the constituting elements should be immediate on the basis of the preceding FIG. 1.

Figure 2:
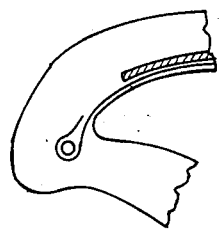
Figure 3:
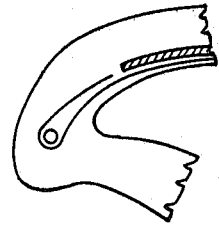

Considering at first an annular reinforcing structure formed by several superimposed layers, some extended from one strap to the other and others limited to the central part of the top portion, the radially innermost layer of the reinforcing structure must have a curvature without inflections from the center line of the tire to the strap, better if the bending radius is decreasing; moreover, its profile may coincide with the inner profile of the top portion (FIG. 2), but may even deviate progressively from it by proceeding from the center line towards the tire shoulders (FIG. 3).

According to a particular version, the reinforcing layers folded about the strap are axially much more extended than the remaining, axially more limited, reinforcing layers superimposed to them, so as to create a zone of less bending stiffness inserted between the strap and the central part of the annular reinforcing structure (FIG. 2). According to another version, affording equally good practical results, the folded portion of said layers, instead of being short, is considerably extended along the underlying structure as far as to reach the nearest end of the remaining layers (FIG. 3).

Figure 4:
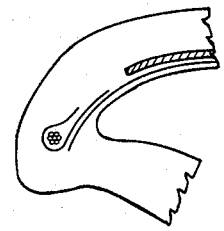
Figure 5:
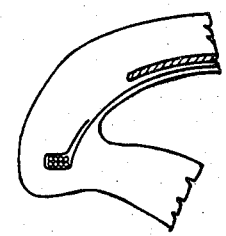

However, the last layers, namely the radially innermost ones, may not be folded about the strap (FIG. 4). In that case, the latter is wound up in a folded strip or "flapper" (making an integral part of the annular reinforcing structure) which extends axially towards the inside, following approximately the profile of the reinforcement end as far as to reach, as limit value, the nearest end of the remaining layers.

Figures 6, 7:
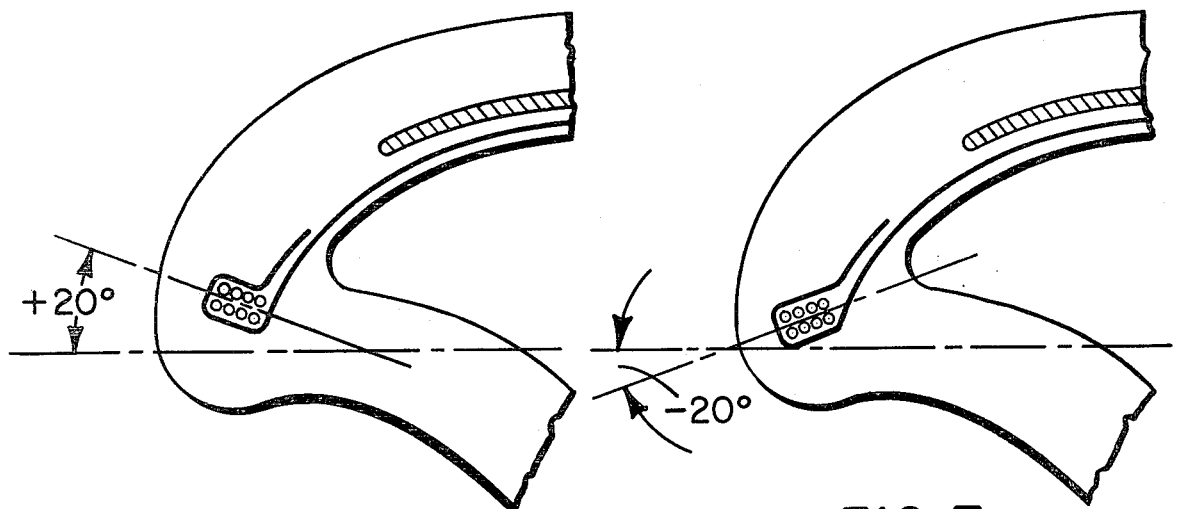
Figure 8:
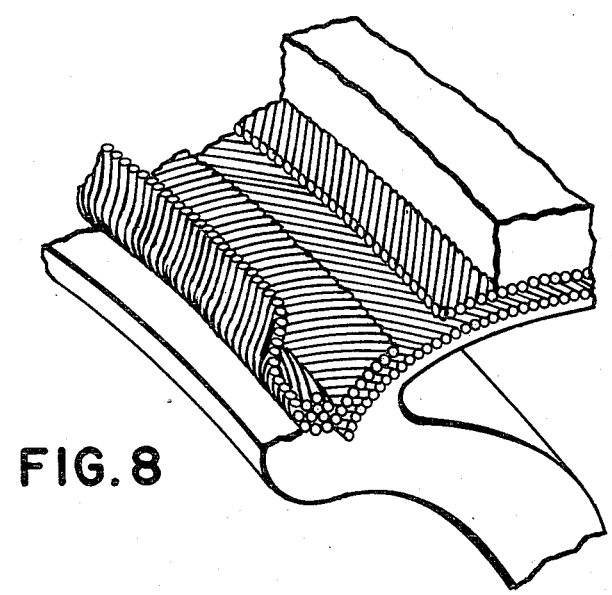

As regards the strap, three constructive solutions have proved particularly advisable. They are respectively carried out with a plurality of wires parallel to one another (FIG. 4) or with a plurality of wires twisted in a strand 10 a shown in FIG. 8 or with a plurality of wires joined in one or more layers arranged to form a quadrangular section, in particular a rectangle, having a base parallel (FIG. 5), or inclined in both senses as shown in FIGS. 6 and 7 with respect to the tire axis, within a range of values from −20° to +20°.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a pneumatic tire for motor vehicles having a generally trapezoidal section and comprising a top portion which is generally convex towards the outside and wider than any other part of the tire, beads, and two sidewalls which spread outwardly from the beads to zones which connect the sidewalls and said top portion, said sidewalls being convex towards the inside and in a condition of substantial compression when the tire is inflated, said top portion having a central tread portion which is normally in contact with the ground when the tire is under load and during rectilinear running of the vehicle, said widewalls being more flexible, at least in the zones which connect them to said shoulders than in the central part of the sidewalls and the shoulders, thereby forming hinges, said top portion comprising a generally annular breaker structure which is substantially inextensible in axial and circumferential directions, the improvement wherein said annular breaker structure is folded at its ends about an annular metallic strap member disposed in each shoulder, and in any radial section of the tire the cincture connection angle between the straight line connecting the center of said shoulder hinge with the center of said strap and a first reference straight line parallel to the axis and passing through the center of said hinge, is between −10° and 30°, said cincture connection angle being negative when lying in a radially inner position with respect to the above-said first reference straight line.

2. The pneumatic tire of claim 1, wherein the cincture edge angle between said first reference straight line and another straight line which is tangent to the radially innermost profile of said annular breaker structure at the point in which the latter is intersected by the plane normal to the tire axis and tangent to the inner surface of the tire in the axially outermost point is between 10° and 60°.

3. The pneumatic tire of claim 1, wherein the sidewall angle between a straight line joining the center of said shoulder hinge with the center of a second similar hinge in the proximity of the bead, and a second reference straight line parallel to the tire axis and passing through the center of said bead hinge is 30° to 60°, said second hinge being formed by a zone of the sidewall which is more flexible then the central part of the sidewall and the bead.

4. The pneumatic tire of claim 1, wherein in any radial section of the tire, said layers are oriented at an angle of from 31 20° to 20° with respect to the said first reference straight line, parallel to the tire axis.

5. The pneumatic tire of claim 1 wherein the cincture connection angle is between 0° and 30°.

6. The pneumatic tire of claim 1 wherein the ratio between the cincture camber and the section height is between 0.3 and 0.6.

7. The pneumatic tire of claim 1 2, or 5 wherein said annular reinforcing structure, in the portion between the two straps, has a curvature without inflections.

8. The pneumatic tire of claim 6 wherein said curvature, in the portion between the tire center line and the strap, has a decreasing bending radius.

9. The pneumatic tire of claim 1 wherein the profiles of the radially inner surface of said top portion and of the radially innermost layer of said annular reinforcing structure diverge progressively from each other from the tire center line towards the shoulders.

10. The pneumatic tire of claim 1 wherein the portion of the radially innermost layer of the annular reinforcing structure folded about said straps extends axially towards the inside, as far as the nearest end of the radially outermost layers of said annular reinforcing structure.

11. The pneumatic tire of claim 1 wherein said strap is wound into a folded strap which extends axially towards the inside, following approximatively the profile of said annular reinforcing structure as far as the nearest end of the radially outermost layers of said annular reinforcing structure.

12. The pneumatic tire of claim 1 wherein said strap comprises a plurality of metal wires annularly wound up into a strand.

13. The pneumatic tire of claim 1 wherein said strap comprises a plurality of metal wires arranged in superimposed layers.

14. The pneumatic tire of claim 3 wherein the annular reinforcing structure has a curvature without inflections between said metallic straps.

* * * * *